United States Patent
Knox (10) Patent No.: US 6,301,626 B1
(45) Date of Patent: Oct. 9, 2001

(54) SYSTEM FOR DYNAMIC CONFIGURATION OF AN INPUT DEVICE BY DOWNLOADING AN INPUT DEVICE LAYOUT FROM SERVER IF THE LAYOUT IS NOT ALREADY DISPLAY ON THE INPUT DEVICE

(75) Inventor: Paul Keith Knox, Ebersberg (DE)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/406,840

(22) Filed: Sep. 28, 1999

Related U.S. Application Data (62) Division of application No. 09/181,874, filed on Oct. 29, 1998, now Pat. No. 6,004,049.

(51) Int. Cl.[7] .................................................. G06F 13/10
(52) U.S. Cl. .............................................. 710/10; 400/89
(58) Field of Search .................................. 710/8, 10, 62; 711/111, 115; 709/217, 213; 400/89, 90, 472

(56) References Cited

U.S. PATENT DOCUMENTS

| | | | |
|---|---|---|---|
| 3,879,722 | * | 4/1975 | Knowlton .............................. 340/324 |
| 4,546,435 | * | 10/1985 | Herbert et al. ....................... 395/705 |
| 4,853,888 | * | 8/1989 | Lata et al. ............................. 341/23 |
| 5,387,042 | * | 2/1995 | Brown .................................. 400/477 |
| 5,718,590 | * | 2/1998 | Choate .................................. 434/227 |
| 5,909,581 | * | 6/1999 | Park ...................................... 395/712 |
| 5,911,529 | * | 6/1999 | Crisan .................................. 400/472 |
| 5,991,760 | * | 11/1999 | Gauvin et al. ........................ 707/10 |
| 6,041,056 | * | 3/2000 | Bigham et al. ...................... 370/395 |
| 6,128,664 | * | 10/2000 | Yanagidate et al. ................. 709/228 |

FOREIGN PATENT DOCUMENTS

| | | |
|---|---|---|
| 63015326 | 1/1986 | (EP) . |
| 0 226 392 | * 6/1987 | (EP) . |
| 0 961 195 A2 | 12/1999 | (EP) . |
| 2 696 888 | 10/1992 | (FR) . |
| US99/24476 | 10/1999 | (WO) . |

OTHER PUBLICATIONS

Yong et al., "Java Input Method Engine," Computer Networks and ISDN Systems, vol. 30, No. 1–7, pp. 271–279 (1998).

"Soft Adaptive Follow–Finger Keyboard for Touch–Screen Pads," IBM Technical Disclosure Bulletin, vol. 36, No. 11, (Nov. 1993).

* cited by examiner

Primary Examiner—Thomas Lee
Assistant Examiner—Thuan Du
(74) Attorney, Agent, or Firm—Finnegan, Henderson, Farabow, Garrett & Dunner, L.L.P.

(57) ABSTRACT

A system and method is provided that displays different symbols on an input device corresponding to different input device layouts. On a keyboard type input device, each key on the keyboard has an individually controllable display device which displays one or more symbols in a given symbol set. Software detects which keyboard layout should be used, downloads the keyboard layout over a network, such as the Internet, and causes the display device in each key to display the appropriate symbol or symbols. A virtual machine embedded in the keyboard provides a platform independent execution environment and simplifies the development of different types of input device layouts. This unique arrangement obviates the need for purchasing different keyboards and software to accommodate the different character sets used by different languages or different specialized software applications.

11 Claims, 6 Drawing Sheets

SYSTEM FOR DYNAMIC CONFIGURATION OF AN INPUT DEVICE BY DOWNLOADING AN INPUT DEVICE LAYOUT FROM SERVER IF THE LAYOUT IS NOT ALREADY DISPLAY ON THE INPUT DEVICE

This is a a division of application Ser. No. 09/181,874, filed Oct. 29, 1998, now U.S. Pat. No. 6,004,049 which is incorporated herein by reference.

BACKGROUND OF THE INVENTION

This invention generally relates to input devices for computer based systems, and more particularly, to a method and apparatus for dynamically configuring an input device.

Conventional input devices like keyboards have a set of electro-mechanical keys that generate symbols when they are actuated. A label is permanently affixed to the keycap of each key and indicates the symbol that the key generates upon actuation. The user refers to the symbol on the keycap to know which symbol the key generates when it is actuated. These symbols include, for example, characters of an alphabet, punctuation, and control indicators such as function keys.

User productivity with computer systems having keyboards as input devices depends on the user's ability to locate keys and enter data quickly. People who use keyboards frequently memorize the location of each key and may only look at the keycaps occasionally. Often, a skilled user can enter 90–120 words of the English language per minute into a computer using a keyboard having a standard keyboard layout such as the QWERTY and Dvorak layouts.

In many circumstances, however, the user may need to change the layout on a keyboard. For example, by moving keycaps a user may switch the layout on the keyboard from one standard layout, such as the QWERTY keyboard layout, to another standard layout, such as the Dvorak keyboard layout, to increase typing efficiency. Unfortunately, conventional techniques for changing keycaps, such as described in U.S. Pat. No. 5,387,042 for a Multilingual Keyboard System, are cumbersome and tedious. That patent requires the user to move keycaps from the one keyboard layout, such as the QWERTY keyboard layout, to the new keyboard layout, such as the Dvorak layout. Further, the patent may require users to install special software on the computer system to interpret characters correctly for each different software application or operating system.

These conventional keyboard layout systems also do not address the expanded alphabets and symbols used in many non-English based languages. Many of the alphabets used in Asian languages, for example, require multiple bytes of data for each character or symbol and may include several thousand different symbols. It is a bewildering task for users to swap overlays or keycaps as described in the referenced patent to accommodate the many different symbols in these alphabets. It can also be expensive to buy new specialized keyboards for each of the different languages.

Even conventional keyboards having electronic light emitting diode (LED) and liquid crystal diode (LCD) displays on the keycaps as described in IBM Technical Disclosure Bulletin, 1981, Vol. 23, p. 4611–4613, do not address the problem of changing the keycaps quickly while the user is typing on the system. In an international context, such as an embassy or an international airport, it would be advantageous to quickly change keyboard layouts to accommodate a user's preferred language. The keyboard described in this IBM Technical Disclosure requires selectively loading different software for each language. Loading different software for each language is generally not an option on computer systems used to provide information to travelers and international visitors. Further, conventional computer systems and keyboards are not designed to swap keyboard device drivers efficiently unless the system is rebooted.

Keyboard layouts are also important in the growing area of interactive computer games and computer-based entertainment software. Games and entertainment oriented software packages generally use special keyboard layouts to control or interact with the software. These games require the user to memorize certain keystrokes to operate features of the game. Generally, each game has a different set of input requirements and thus uses a different keyboard layout. Unfortunately, the conventional techniques for swapping keycaps in the aforementioned patent would be too cumbersome for most game users in practice. Likewise, loading a special device driver for each game using the keyboard device described in the aforementioned IBM Technical Disclosure is too tedious and complex for the average game user.

Based on the above discussion, it is desirable to provide a dynamically configurable input device.

SUMMARY OF THE INVENTION

In accordance with the present invention, as embodied and broadly described herein, a method for configuring an input device having a set of display elements comprises the steps of selecting an input device layout, retrieving the input device layout from a network, and displaying a set of symbols on the display elements corresponding to the input device layout.

BRIEF DESCRIPTION OF THE DRAWINGS

The accompanying drawings, which are incorporated in and constitute a part of this specification, illustrate an embodiment of the invention and, together with the description, serve to explain the principles of the invention.

In the drawings.

DETAILED DESCRIPTION
INTRODUCTION

Reference will now be made in detail to an implementation of the present invention as illustrated in the accompanying drawings. The same reference numbers will be used throughout the drawings and the following description to refer to the same or like parts.

Methods and systems consistent with the present invention dynamically configure an input device by downloading an input device layout from a network and displaying on a display element for each key of the input device a symbol in accordance with the layout. According to systems designed in accordance with the present invention, an input device such as a keyboard is operatively coupled to a computer system connected to a network. The input device communicates with the computer system using an interface protocol appropriate for the particular input device and the computer system communicates with other computers on the network using a common networking protocol such as TCP/IP or UDP/IP.

There also may be a remote procedure call (RPC) subsystem on the computer system that facilitates remote processing requests between the input device, the computer system, and remote computers connected to the network. For example, the RPC subsystem enables software applications executing on the computer system to display keyboard overlays on the keys of the input device. Remote method invocation (RMI) developed by Sun Microsystems, Inc. is one such RPC subsystem capable of providing these features. Those skilled in the art, however, will appreciate that other RPC subsystems, such as DCOM/COM from Microsoft, Inc., may be used.

SYSTEM CONFIGURATION

Figure 1:
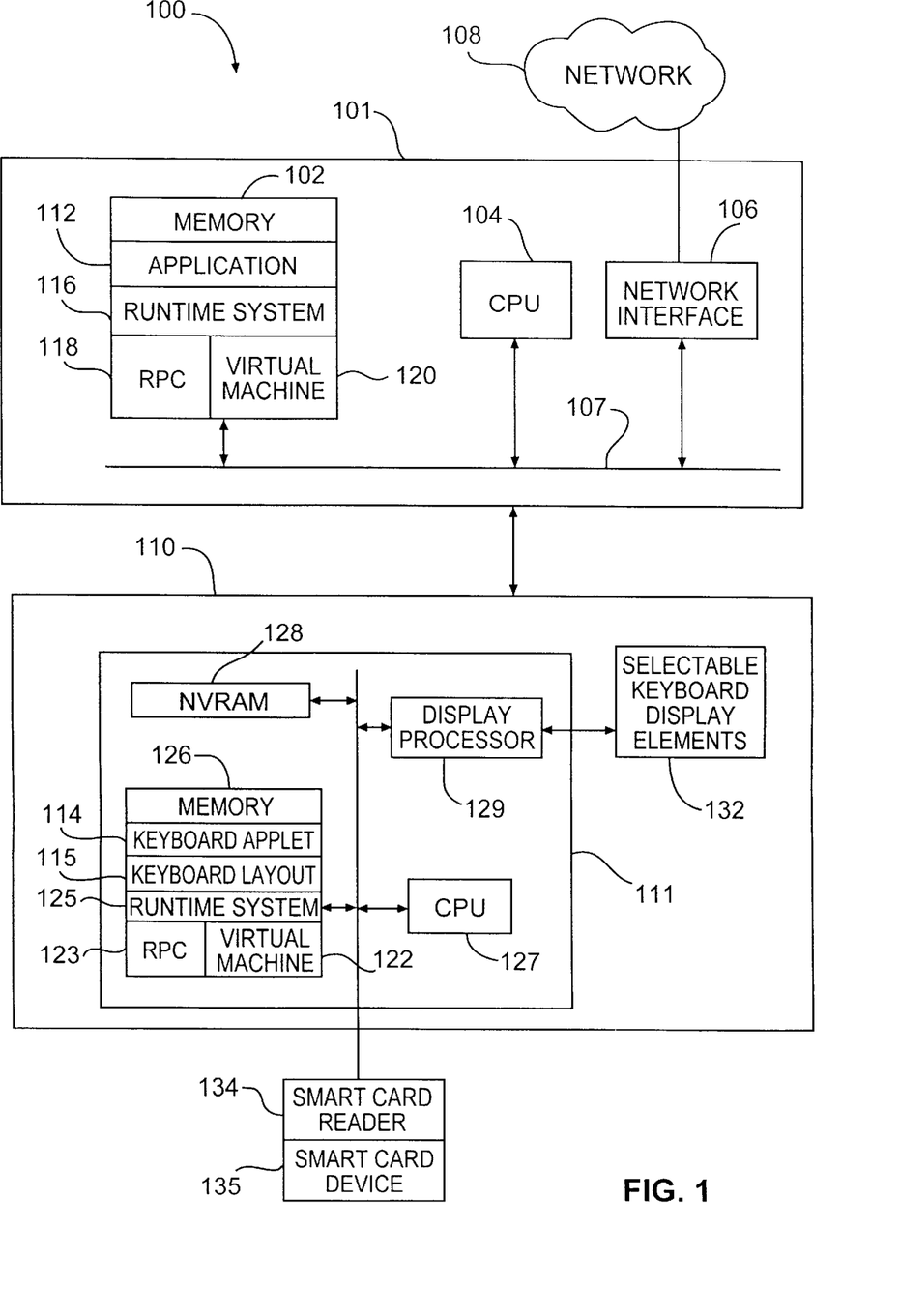
FIG. 1 is block diagram of a computer system and keyboard consistent with the present invention.

FIG. 1 is block diagram of an exemplary system 100 with which methods and systems consistent with the present invention may be implemented. System 100 includes a computer 101 and a keyboard device 110. Computer 101 includes a memory 102, a CPU 104, a network interface 106 to connect to a network 108, and a bus 107 that provides connectivity and communication among these components. Bus 107 uses a bus protocol such as ISA, PCI, or SCSI. Network 108 may be a Local Area Network (LAN), a Wide Area Network (WAN), or the Internet.

Memory 102 includes an application 112 and a runtime system 116. A user may need a special keyboard layout when executing application 112. For example, a game application may use a special set of keys on a keyboard to interact with the game. Internationalized applications that operate in different languages may also need a special set of keys on a keyboard corresponding to the alphabet of a particular language.

Runtime system 116 provides an execution environment that enables computer system 101 to process application 112. In one embodiment, runtime system 116 includes a virtual machine 120, such as the Java™ Virtual Machine, and an RPC subsystem 118 such as RMI. Application 112 may utilize an Application Programming Interface (API) to access runtime system 116 and the various subsystems in a platform-independent manner. The Java™ Virtual Machine, RMI, and API are provided as part of the Java™ Development Kit from Sun Microsystems, Inc. of Mountain View, Calif.

Virtual machine 120 facilitates platform independence. Virtual machine 120 is an abstract computing machine that receives instructions from programs in the form of bytecodes. These bytecodes are interpreted and dynamically converted into a form for execution, such as object code, on a processor such as CPU 104. Virtual machine 120 can be a process in memory 102 simulating execution of instructions of a virtual machine or it can be an integrated circuit processor designed to be compatible with the architecture of virtual machine 120.

RPC 118 facilitates remote method invocation. Remote method invocation allows a process executing on one device to invoke a method or procedure associated with a process executing on another device. Typically a network connected between the two computers facilitates communication necessary to perform the remote method invocation.

Keyboard input device 110 includes a processor complex 111 and selectable keyboard display elements 132. Processor complex 111 includes a memory 126, a display processor 129, a CPU 127, and a non-volatile random access memory (NVRAM) 128. Each component in processor complex 111 may be a collection of discrete processing subsystems or may be a processor on an integrated circuit (IC) capable of processing keystrokes and driving selectable keyboard display elements 132.

Each keyboard display element 132 displays a symbol. In one implementation, one selectable keyboard display element 132 can be an electro-mechanical device actuated when the user depresses and releases the device. A display device on each selectable keyboard display element 132 indicates which symbol is generated.

A smartcard reader 134 may be connected to a bus, such as a serial bus, on keyboard 110. This smartcard reader interfaces with a smartcard device 135. Smartcard device 135 can hold a user's preferences associated with configuring computer system 101 and may also include a keyboard applet or a user's preferred keyboard layout. For example, smartcard device 135 can define the language that selectable keyboard display elements 132 should display and the keys for displaying special functions for file management operations, macro invocations, and other often used functions in applications such as wordprocessors.

Memory 126 includes a keyboard applet 114, a keyboard layout 115, a runtime system 125, such as the Java™ runtime environment, a virtual machine 122, such as the Java™ virtual machine, and an RPC 123 subsystem. Subsystems in memory 126 operate in a similar manner to like named subsystems discussed previously. RPC 123 and RPC 118 enable application 112 to invoke methods associated with keyboard applet 114 executing on keyboard 110. Applets, such as keyboard applet 114, are modular software components that perform a subset of functions in a software application. The applet can be written in a procedural programming language such as C or an object-oriented language such as the Java™ programming language. Typically, virtual machine 122 is used to process methods associated with keyboard applet 114. For example, actuating a key on keyboard 110 causes applet 114 to send a keyboard symbol in the form of a signal back to application 112 for further processing. This enables application 112 to distribute execution of instructions on CPU 104 as well as CPU 127.

A keyboard layout 115 provides the data to indicate the symbols generated when actuating a key on keyboard 110. Technically, a user actuates a key on a keyboard by depressing a key, releasing a key, or depressing and releasing a key or combination of keys on the keyboard. In one implementation consistent with the present invention, keyboard layout 115 may include a look-up table that maps certain keys to certain functions in an application. By changing the keyboard layout 115, a keyboard 110 has the capability of generating different symbols on the keycaps.

Keyboard applet 114 can be used to process keyboard layout 115 in several ways. In one implementation consistent with the present invention, each keyboard applet contains a different keyboard layout. To change a keyboard layout, computer system 100 downloads a different keyboard applet containing the new keyboard layout from either host computer 101, network 108, or smart card 134. The keyboard applet containing the keyboard layout such as keyboard layout 115 displays the appropriate characters on selectable keyboard display elements 132. In an alternative implementation consistent with the present invention, keyboard applet 114 and keyboard layouts are stored separately on, for example, different parts of network 108. In this implementation, one keyboard applet can be used to process many different keyboard applets downloaded over network 108.

In an object-oriented programming environment, a class loader mechanism, such as the class loader used for the Java™ programming language, may be used to locate and download the appropriate keyboard applet, keyboard layout, and related object classes automatically. Additional information relating to class loaders and the Java™ programming language can be found in "The Java™ Virtual Machine Specification" by Tim Lindholm and Frank Yellin, Addison Wesley, 1997, which is incorporated by reference herein.

Display processor 129 responds to keyboard applet 114 and displays symbols in accordance with keyboard layout 115 on display elements 132. Keyboard layout information may be stored in NVRAM 128 or similar memory storage while the system is powered down or in a suspended processing state.

AN EXEMPLARY KEYBOARD

Figure 2:
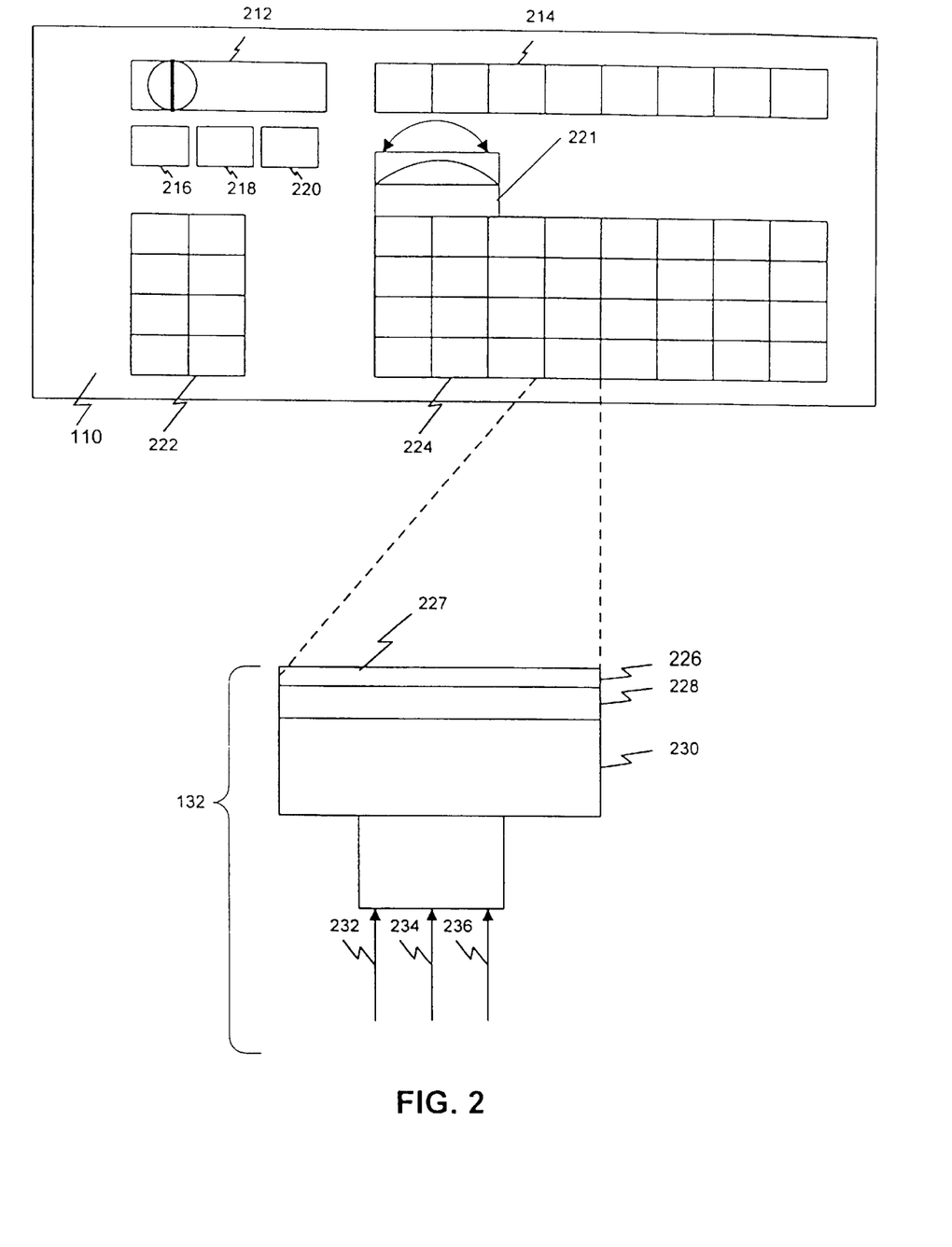
FIG. 2 is a block diagram representation of a keyboard and keycap design consistent with present invention.

FIG. 2 is a block diagram representation of a keyboard input device designed consistent with one implementation of the present invention. Keyboard input device 110 includes a keyboard layout indicator switch 212, a rotatable keyboard layout selector 221, a function key bank 214, application keys 222, and general keys 224. Unless indicated otherwise, function key bank 214, application keys 222, and general keys 224 are collectively referred to as the keys of keyboard input device 110. Each key implements a selectable keyboard display element 132 consistent with implementations of the present invention.

The user can use rotatable keyboard layout selector 221 and switching keyboard layout indicator switch 212 in combination to load different keyboard layouts into keyboard input device 110. In addition to different languages, the keyboard layouts may display special functions associated with certain software applications to be displayed on the keys. For example, spreadsheet functions used with a spreadsheet application may be loaded into function key bank 214. Descriptive symbols or text can also be displayed on each of the keys in function key bank 214. Similarly, application keys 222 may display labels associated with macros or other functions often used in a particular application. General keys 224 can also be modified to display symbols or text in a similar manner.

Keyboard layout switch 212 allows a user to select from a set of keyboard layouts as indicated by the corresponding keyboard layout indicators 216–220. Keyboard layout indicators 216–220 are small display components that present different keyboard layouts available to the user on keyboard input device 110. For example, layout indicators 216–220 can contain the words "English", "French", or "German". This would indicate that English, French, and German keyboards can be selected by sliding keyboard layout indicator switch 212 accordingly. Although only three layout indicators are described, alternate implementations may include more or fewer indicators.

Rotatable keyboard layout selector 221 enables a user to scroll through many different keyboard layouts. A wheel or similar component may be used as the rotatable keyboard layout selector 221. As the user rotates selector 221, different labels identifying available keyboard layouts are displayed in layout indicators 216–220. In addition, as the user scans the keyboard layouts, the keys may also display the corresponding set of symbols associated with each keyboard layout. The user can then select one of the keyboard layouts provided in layout indicators 216–220 using a predetermined keystroke, a mouse button, or by actuating a touch sensitive overlay on the corresponding layout indicator 216–220.

FIG. 2 also illustrates a side view of one selectable keyboard display element 132. A keycap 227 specially designed to display a symbol is attached to the upper portion of selectable keyboard display elements 132. Keycap 227 includes a translucent protective layer 226 adhered to a display element 228 and inserted in a support structure 230. Keycap 227 accepts a power input 232 to drive display element 228 and a signal input 234 with a sufficient number of bits to generate the various displayable symbols on keycap 227. An output signal 236 corresponding to the symbol displayed on keycap 227 is generated when selectable keyboard display elements 132 is actuated. Selectable keyboard display element 132 may be an electro-mechanical or solid state device, depending on the particular implementation.

EXEMPLARY DYNAMIC CONFIGURATION OF KEYBOARD INPUT DEVICE

Figure 3:
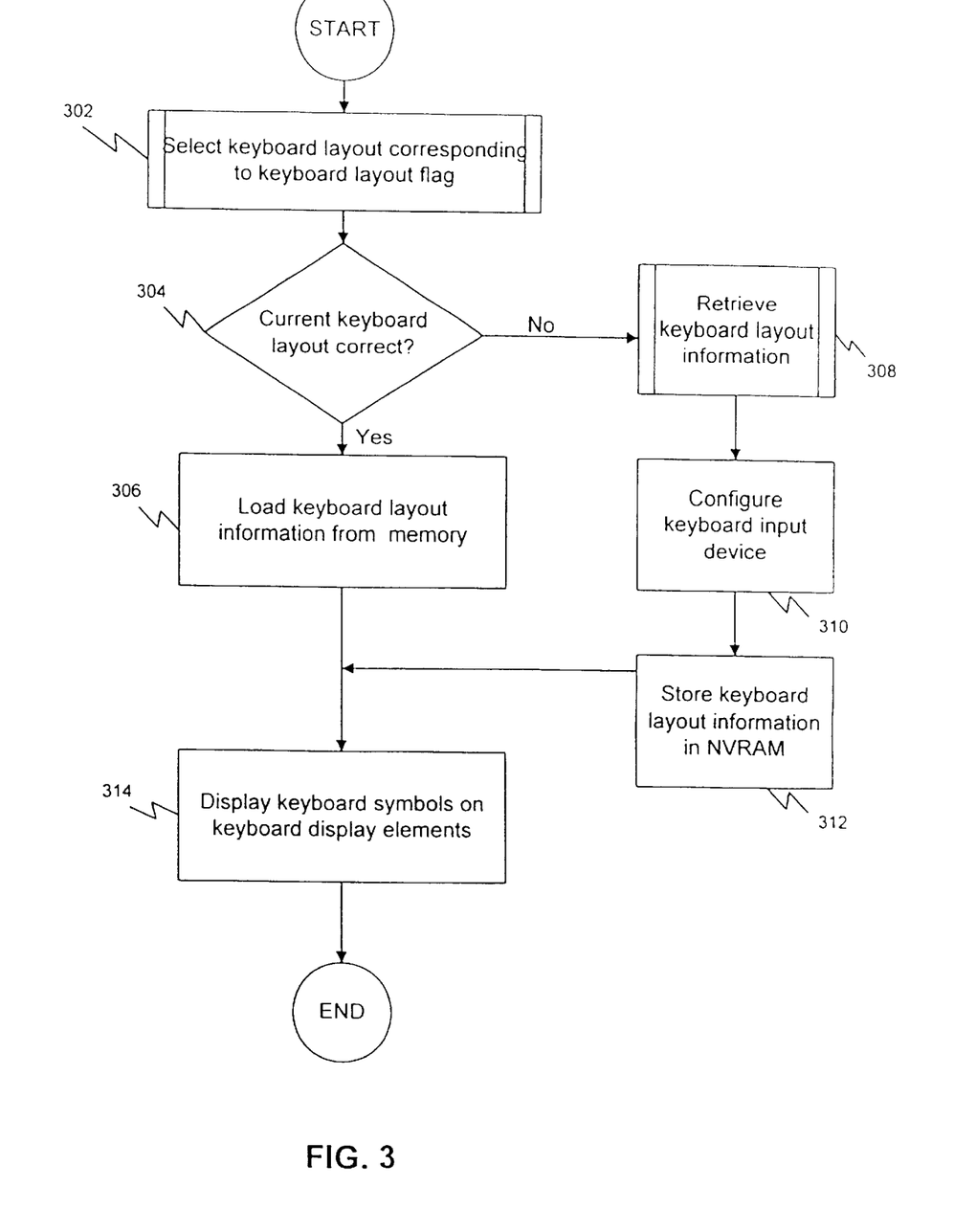
FIG. 3 is a flowchart for dynamically configuring a keyboard overlay on a keyboard consistent with present invention.

FIG. 3 is a flowchart of the steps for dynamically configuring a keyboard layout in a manner consistent with the present invention. Keyboard applet 114 on keyboard input device 110 checks computer system 101 for a layout flag (step 302). The layout flag is an indicator used to determine a selected keyboard layout to be loaded. Typically, the layout flag is set within the execution environment as an environment variable or within the application as an application variable. This flag permits application 112 to override switch settings on keyboard input device 110. For example, a software application may temporarily load a different keyboard layout regardless of the settings of rotatable keyboard layout selector 221 and keyboard layout switch 212. To do this, the software application would set the layout flag to the desired value. Keyboard applet 114 then uses the setting in the layout flag to select the keyboard layout.

Keyboard applet 114 determines if the selected keyboard layout from computer system 101 is already being displayed on the keyboard (step 304). When the selected keyboard layout is already displayed, keyboard applet 114 uses keyboard layout 115 in memory 126 to map the proper symbol or symbols to each keycap 227 on keyboard input device 110 (step 306).

Alternatively, keyboard layouts can be downloaded over a network if the selected keyboard layout is not already loaded in keyboard input device 110. Keyboard applet 114 locates the proper keyboard layout on a computer system coupled to network 108. Keyboard layout 115 can be retrieved on demand from the network (step 308).

Once downloaded, CPU 104 invokes a configuration method within keyboard applet 114 to configure keyboard input device 110 (step 310). Keyboard applet 114 then stores keyboard layout information associated with the correct configuration of keyboard 110 in NVRAM 128 (step 312).

Keyboard input device 110 displays symbols on each key corresponding to the keyboard layout (step 314). Depending on the number of symbols and the complexity of symbols, various display technologies can be used to create the appropriate display key. For example, each key may include a keycap having a an LCD capable of displaying single byte or double byte characters. The display on each keycap may display a single symbol or multiple symbols depending on the application. When a user activates a key, the key provides computer system 101 with a corresponding symbol or symbols as displayed on the keycap.

Figure 4:
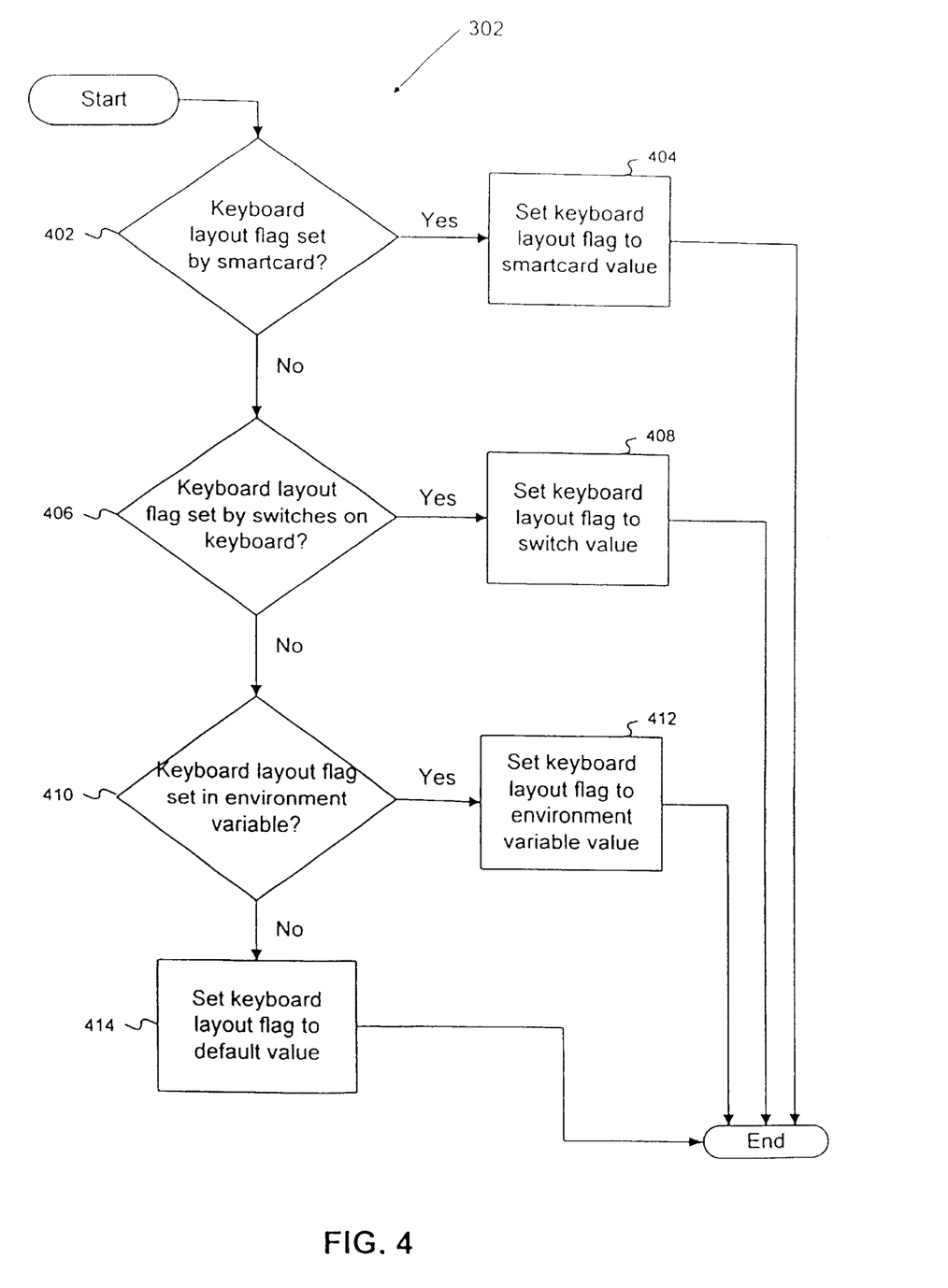
FIG. 4 is a flowchart used to detect which keyboard layout should be used in accordance with the present invention.

Various techniques can be used to set the layout flag on the computer system. FIG. 4 is a flowchart illustrating exemplary steps used by keyboard applet 114 to select a layout flag. This flowchart relates to step 302 in FIG. 3. Keyboard applet 124 initially checks for a layout flag as set by a smartcard device (step 402). If a smartcard device is present, keyboard applet 114 sets the layout flag in computer system 101 to the value in the smartcard device (step 404). For example, this enables a user to select a keyboard layout by inserting a smartcard device into the keyboard of the computer system. For an international traveler, a layout flag stored in the smartcard device can be used to make a keyboard download over a network, such as the Internet, a keyboard layout in the traveler's native language. If a network is not available, a smartcard device may also include an actual keyboard applet or keyboard layout. The keyboard applet or keyboard layout would then be downloaded directly from storage on the smartcard device rather than from the network.

A layout flag may also be set using switches such as rotatable keyboard layout selector 221 and keyboard layout indicator switch 212 on keyboard input device 110. Accordingly, keyboard applet 114 checks to determine if a layout flag is set by switches on the keyboard (step 406). Keyboard applet 114 then sets the layout flag based upon the setting of the keyboard switches on the keyboard (step 408). Some keyboards may have the display elements on each keycap but may not have switches on the keyboards. On a keyboard without these switches, keyboard applet 114 may set the layout flag according to an environment variable set in the operating system (step 410). The operating system, an application, or a user can set this environment variable to select the appropriate keyboard layout. The keyboard applet 114 then sets the layout flag to the environment variable value (step 412). Alternatively, if techniques discussed above do not set the layout flag, keyboard applet 114 selects a default value for the layout flag (step 414). This default value may be stored in NVRAM 128.

Figure 5:
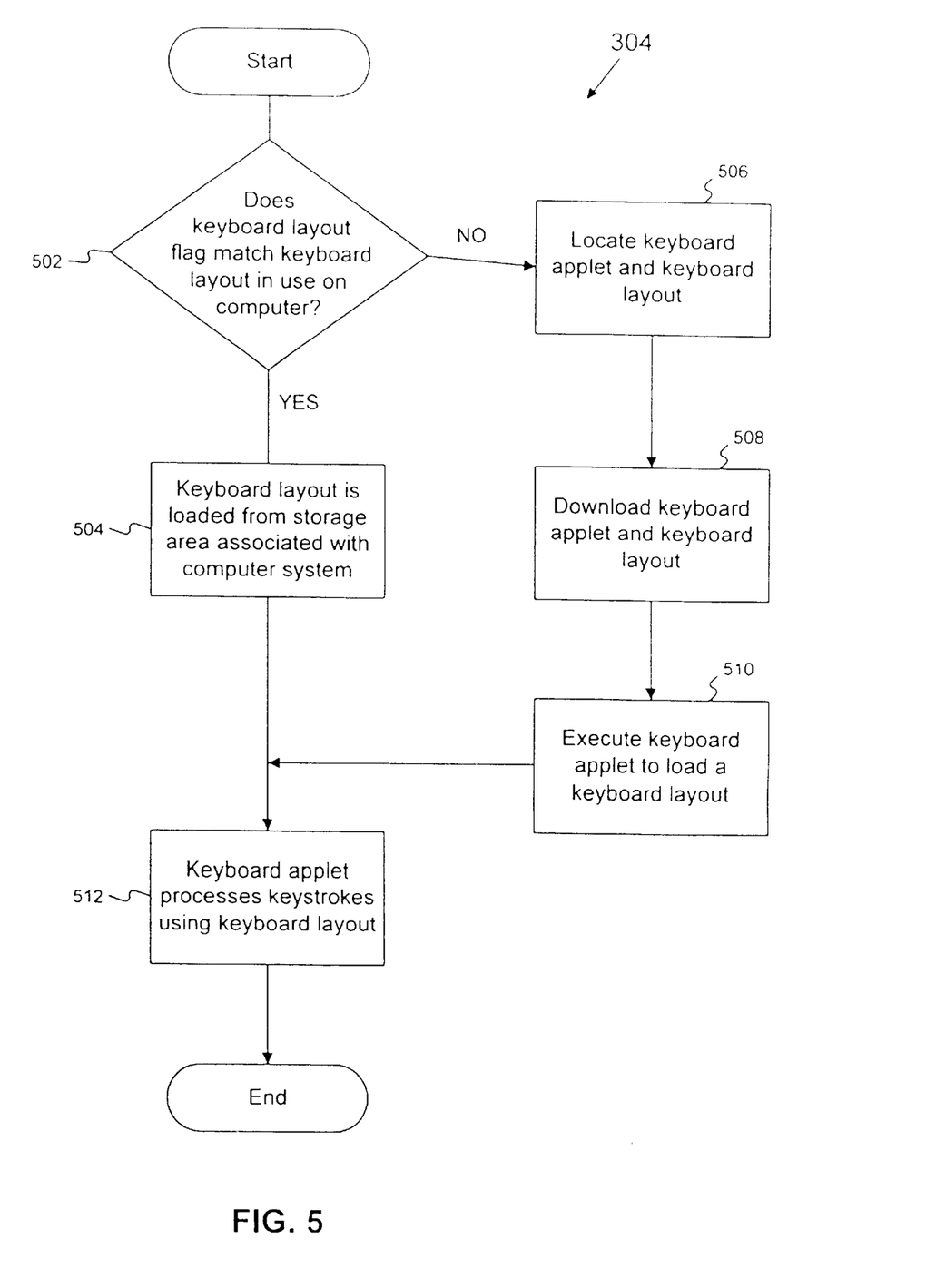
FIG. 5 is a flowchart used to process the keyboard layout generated in accordance with the present invention.

FIG. 5 is a flowchart indicating the method steps used by a keyboard applet to display a keyboard layout on keyboard input device 110. These steps relate to step 308 in FIG. 3. Initially, keyboard applet 114 determines if the layout flag corresponds to the keyboard layout in use on the computer system (step 502). Generally, keyboard applet 114 queries NVRAM 128 for parameters that indicate the keyboard layout in use on the input device. NVRAM can be used to store data accessed when computer system 101 is booted as well as during execution. If the layout flag corresponds to the keyboard layout in use on the system then the keyboard layout is loaded from NVRAM 128, memory 126, or other storage areas associated with computer system 101 (step 504).

If the layout flag does not correspond to the keyboard layout in use, then keyboard applet 114 must locate and display the appropriate keyboard layout. Keyboard applet 114 locates a keyboard layout that corresponds to the layout flag and uses the keyboard layout for keyboard input device 110. If keyboard applet 114 requires an update, keyboard applet 114 may also locate an updated keyboard applet capable of loading the keyboard layout corresponding to the layout flag (step 506). Generally, keyboard applets and keyboard layouts are stored on a server computer connected to a network such as the Internet.

Accordingly, keyboard applet 114 downloads and stores a keyboard layout or a new keyboard applet into keyboard input device 110 (step 508). Typically, the new keyboard applet will replace the existing applet when computer system 101 is rebooted. Application 112 then executes the keyboard applet to load the appropriate keyboard layout (step 510). Applications executing on computer system 101 use keyboard applet 114 to process keystrokes entered on keyboard input device 110 (step 512).

Figure 6:
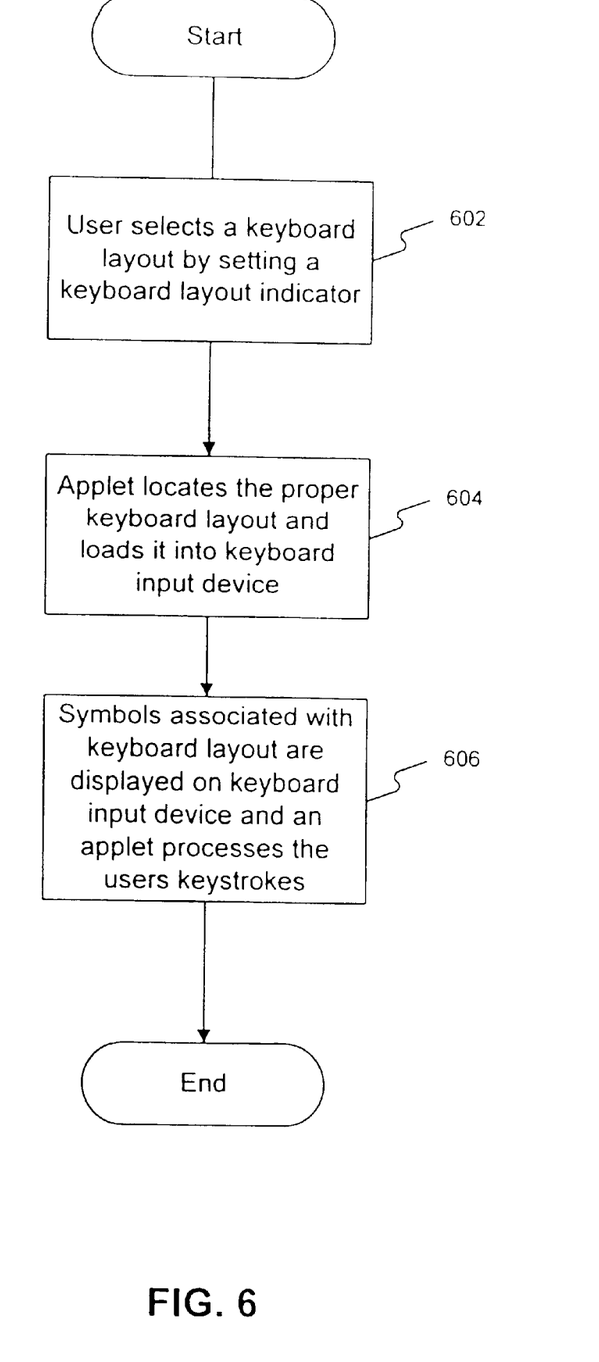
FIG. 6 is a flowchart used to operate a keyboard input device implemented in a manner consistent with the present invention.

In operation, a user operates a keyboard input device 110 as indicated by the method steps in the flowchart in FIG. 6. Initially, the user selects a keyboard layout (step 602). The user can select the keyboard layout by setting switches on keyboard 110 as discussed above. A keyboard applet implemented in accordance with the principles described herein locates the proper keyboard layout and loads it into keyboard input device 110 (step 604). The appropriate symbols are displayed on keyboard input device 110 and the keyboard applet processes the users keystrokes (step 606).

While specific embodiments have been described herein for purposes of illustration, various modifications may be made without departing from the spirit and scope of the invention. Instead of using a keyboard input device as discussed above, other implementations consistent with the present invention can also be applied to any input device capable of displaying symbols on a selectable button or area. These input devices can include mice, joysticks, touch pads, touch-screens, and other devices used to interact with a computer system. In another implementation, a keyboard applet and keyboard layout can be stored in memory on the computer system instead of memory in the keyboard input device. The keyboard applet is executed on the computer system and used to display symbols corresponding to the keyboard layout on the keyboard input device. Furthermore, although aspects of the present invention are described as being stored in memory and other storage mediums, one skilled in the art will appreciate that these aspects of the present invention can also be stored on or read from other types of computer-readable media, such as secondary storage devices, like hard disks, floppy disks, or CD-ROM; a carrier wave or other propagation medium from the Internet; or other forms of RAM or ROM. Accordingly, the invention is not limited to the above described embodiments, but instead is defined by the appended claims in light of their full scope of equivalents.

What is claimed is:

1. A computer-readable medium containing instructions for performing a method to configure an input device having a set of display elements capable of displaying symbols, the method comprising the steps of:
    selecting an input device layout;
    retrieving the input device layout from a network, wherein the retrieving step further includes the steps of:
        determining if the identified input device layout is already displayed on the input device; and
        downloading the identified input device layout over the network from a server having a plurality of input device layouts based upon the determination; and
        displaying a set of symbols on the display elements corresponding to the input device layout.

2. The computer-readable medium in claim 1 wherein the selecting step further includes instructions for reading an environment variable that indicates the input device layout.

3. The computer-readable medium in claim 1 wherein the selecting step further includes instructions for reading a switch value that indicates the input device layout.

4. The computer-readable medium of claim 1 wherein the selecting step further includes instructions for reading a value from a smartcard that indicates the input device layout.

5. The computer-readable medium of claim 1 wherein the retrieving step further includes the step of downloading the identified input device layout from a server connected to the network.

6. The computer-readable medium of claim 1 wherein the retrieving step further includes the step of downloading an applet containing the identified input device layout over the network from a server having a plurality of applets capable of processing input device layouts.

7. A computer-readable medium containing instructions for performing a method to configure an input device having a set of display elements capable of displaying symbols, the method comprising the steps of:

selecting an input device layout;

retrieving the input device layout from a network, wherein the retrieving step further includes the steps of:
   determining if the identified input device layout is already displayed on the input device; and
   downloading an applet having the identified input device layout over the network from a server having a plurality of applets capable of processing device layouts based upon the determination; and
   displaying a set of symbols on the display elements corresponding to the input device layout.

8. A processor designed to configure an input device having a set of display elements capable of displaying symbols, comprising:

means for identifying an input device layout;

means for accessing the input device layout over a network means for determining if the identified input device layout is already displayed on the input device;

means for downloading the identified input device layout over the network from a server having a plurality of input device layouts based upon the determination; and means for displaying a set of symbols on the display elements corresponding to the input device layout.

9. A data processing system that facilitates configuring an input device having a set of display elements, comprising:

a server capable of storing a plurality of input device layouts; and a network connected to the server that enables the plurality of input device layouts to be downloaded into the input device; and a processor connected to the network that identifies an input device layout, accesses the input device layout over the network, determines if the identified input device layout is already displayed on the input device, downloads the identified input device layout over the network from the server based upon the determination, and displays a set of symbols on the display elements corresponding to the input device layout.

10. A processor designed to configure an input device having a set of display elements capable of displaying symbols, comprising:

means for identifying an input device layout;

means for accessing the input device layout over a network means for determining if the identified input device layout is already displayed on the input device;

means for downloading an applet having the identified input device layout over the network from a server having a plurality of applets capable of processing device layouts based upon the determination; and means for displaying a set of symbols on the display elements corresponding to the input device layout.

11. A data processing system that facilitates configuring an input device having a set of display elements, comprising:

a server capable of storing a plurality of input device layouts; and a network connected to the server that enables the plurality of input device layouts to be downloaded into the input device; and a processor connected to the network that identifies an input device layout, accesses the input device layout over the network, determines if the identified input device layout is already displayed on the input device, downloads an applet having the identified input device layout over the network from the server based upon the determination, and displays a set of symbols on the display elements corresponding to the input device layout.

* * * * *

UNITED STATES PATENT AND TRADEMARK OFFICE
CERTIFICATE OF CORRECTION

PATENT NO.    : 6,301,626 B1
DATED         : October 9, 2001
INVENTOR(S)   : Paul Keith Knox It is certified that error appears in the above-identified patent and that said Letters Patent is hereby corrected as shown below:

<u>Title page,</u>
Item [54] "DISPLAY" should read -- DISPLAYED --;

<u>Column 10, claim 10,</u>
Lines 14 and 15, a semicolon and line break should be inserted after "network".

Signed and Sealed this

Second Day of April, 2002

Attest:

JAMES E. ROGAN
*Attesting Officer*    *Director of the United States Patent and Trademark Office*